(12) United States Patent
Cadio et al.

(10) Patent No.: US 7,731,369 B2
(45) Date of Patent: Jun. 8, 2010

(54) METHOD AND SYSTEM FOR MOUNTING A LIGHT ENGINE ASSEMBLY

(75) Inventors: Michel Cadio, Carmel, IN (US); Mark Yoder, Carmel, IN (US)

(73) Assignee: TTE Technology Inc., Indianapolis, IN (US)

( * ) Notice: Subject to any disclaimer, the term of this patent is extended or adjusted under 35 U.S.C. 154(b) by 295 days.

(21) Appl. No.: 11/793,343

(22) PCT Filed: Dec. 29, 2005

(86) PCT No.: PCT/US2005/047553
§ 371 (c)(1),
(2), (4) Date: Jun. 18, 2007

(87) PCT Pub. No.: WO2006/074102
PCT Pub. Date: Jul. 13, 2006

(65) Prior Publication Data
US 2008/0164786 A1      Jul. 10, 2008

Related U.S. Application Data

(60) Provisional application No. 60/641,599, filed on Jan. 5, 2005.

(51) Int. Cl.
G03B 21/14      (2006.01)
G03B 21/22      (2006.01)
G03B 21/28      (2006.01)
H04N 5/64       (2006.01)

(52) U.S. Cl. .......................... 353/74; 353/77; 353/119; 348/836; 348/839

(58) Field of Classification Search .................. 353/57, 353/74–80, 119; 348/771, 787, 794, 836, 348/839; 248/121, 200, 217.2, 475.1, 674, 248/917–924
See application file for complete search history.

(56) References Cited

U.S. PATENT DOCUMENTS

| 5,969,754 A * | 10/1999 | Zeman ........................ 348/136 |
| 6,243,149 B1 * | 6/2001 | Swanson et al. ............... 349/62 |
| 6,726,332 B2 * | 4/2004 | Cannon et al. ................ 353/33 |
| 6,883,920 B2 * | 4/2005 | Chen ........................... 353/119 |
| 6,921,174 B1 * | 7/2005 | Duggan et al. ................ 353/74 |
| 2003/0058415 A1 * | 3/2003 | Cha et al. ..................... 353/77 |
| 2003/0133083 A1 * | 7/2003 | Chen et al. .................... 353/74 |

(Continued)

FOREIGN PATENT DOCUMENTS

EP      1137276      9/2001

(Continued)

OTHER PUBLICATIONS

Cadio, et al., PCT International Preliminary Report on Patentability, Jul. 19, 2007, Geneva Switzerland.

Primary Examiner—Georgia Y Epps
Assistant Examiner—Jori S Byrne-Daikun
(74) Attorney, Agent, or Firm—Fletcher Yoder PC

(57) ABSTRACT

A system and method for mounting a light engine assembly is provided. More specifically, the system comprises a housing structure including an upper portion and a lower portion, a mounting structure coupled to the housing structure, wherein the mounting structure is not affixed to the lower portion, and a light engine coupled to the mounting structure.

14 Claims, 4 Drawing Sheets

U.S. PATENT DOCUMENTS

| | | | |
|---|---|---|---|
| 2003/0137755 A1* | 7/2003 | Chang et al. | 359/871 |
| 2004/0119952 A1* | 6/2004 | Chen | 353/119 |
| 2004/0130686 A1* | 7/2004 | Tseng et al. | 353/122 |
| 2005/0248690 A1* | 11/2005 | Kim | 348/743 |
| 2005/0248692 A1* | 11/2005 | Jang | 348/748 |
| 2006/0023169 A1* | 2/2006 | Jung | 353/78 |
| 2006/0109433 A1* | 5/2006 | Chen | 353/119 |
| 2008/0011911 A1* | 1/2008 | Kim et al. | 248/121 |

FOREIGN PATENT DOCUMENTS

| | | |
|---|---|---|
| JP | 05191757 | 7/1993 |
| JP | 2001209125 A | 4/2001 |

* cited by examiner

METHOD AND SYSTEM FOR MOUNTING A LIGHT ENGINE ASSEMBLY

CROSS-REFERENCE TO RELATED APPLICATIONS

This application is a continuation of International Application No. PCT/US2005/047553, filed on Dec. 29, 2005, which claims priority to U.S. Provisional Patent Application No. 60/641,599, filed on Jan. 5, 2005.

FIELD OF THE INVENTION

The present invention relates generally to projecting video images onto a screen. More specifically, the present invention relates to a system for mounting a light engine assembly within a video unit housing.

BACKGROUND OF THE INVENTION

This section is intended to introduce the reader to various aspects of art which may be related to various aspects of the present invention which are described below. This discussion is believed to be helpful in providing the reader with background information to facilitate a better understanding of the various aspects of the present invention. Accordingly, it should be understood that these statements are to be read in this light, and not as admissions of prior art.

The prevalence and number of available display systems has grown in recent years. Such display systems include cathode ray tube ("CRT") televisions, LCD ("Liquid Crystal Display") televisions, DLP ("Digital Light Projection") televisions, plasma screen televisions, and/or video projectors. These systems utilize various components to present images to a user of the display system. For instance, with a rear projection DLP television, a light engine assembly may utilize a source to project an image through a mirror to a screen. As these systems have evolved, the systems that provide clearer and more precise images have become desirable. Thus, a design goal of many systems is to provide images with little error.

In systems that utilize a light engine assembly, such as DLP televisions, the light engine assembly is generally installed on the base or ground portion of the cabinet, while the screen and mirror may be coupled to other portions of the cabinet, such as a top or upper portion. As a result, the image projected on the screen relies on the accuracy of several molded plastic cabinet parts, each having different mechanical tolerances. These tolerances may vary considerably relative to the requirements of a microdisplay system utilized in the light engine assembly.

Because these tolerances vary, the operators of the systems have relied on several methods to adjust the system to remove or minimize alignment errors that cause distortions or other problems. For instance, operators have installed shims or in-cabinet adjustment screws. Further, the manufacturers have required more restrictive tolerances of the cabinet parts. These various methods have increased the cost of manufacturing the systems (labor and component parts) and increased complexity of the system. A cost-effective method and apparatus for reducing the alignment errors is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present invention is directed towards a method and system for mounting a light engine assembly in a housing structure, such as a cabinet. The method and system may include mounting the light engine assembly to the upper portion of the cabinet to bypass the base or floor portion of the cabinet. This mounting system may reduce the effects of cabinet tolerance on the projected image by removing the need for precise tolerances between the top and base portion of the cabinet. In particular, the light engine assembly is mounted into a compact support structure, and then attached directly to the upper cabinet. Along with the light engine assembly, a fold mirror and screen are also attached to the upper cabinet, which is a single molded part. As a result, the light engine assembly, fold mirror and screen are attached to the same portion of the cabinet (the upper portion), which reduces the tolerance stackup or tolerance variations associated with the base portion of the cabinet.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
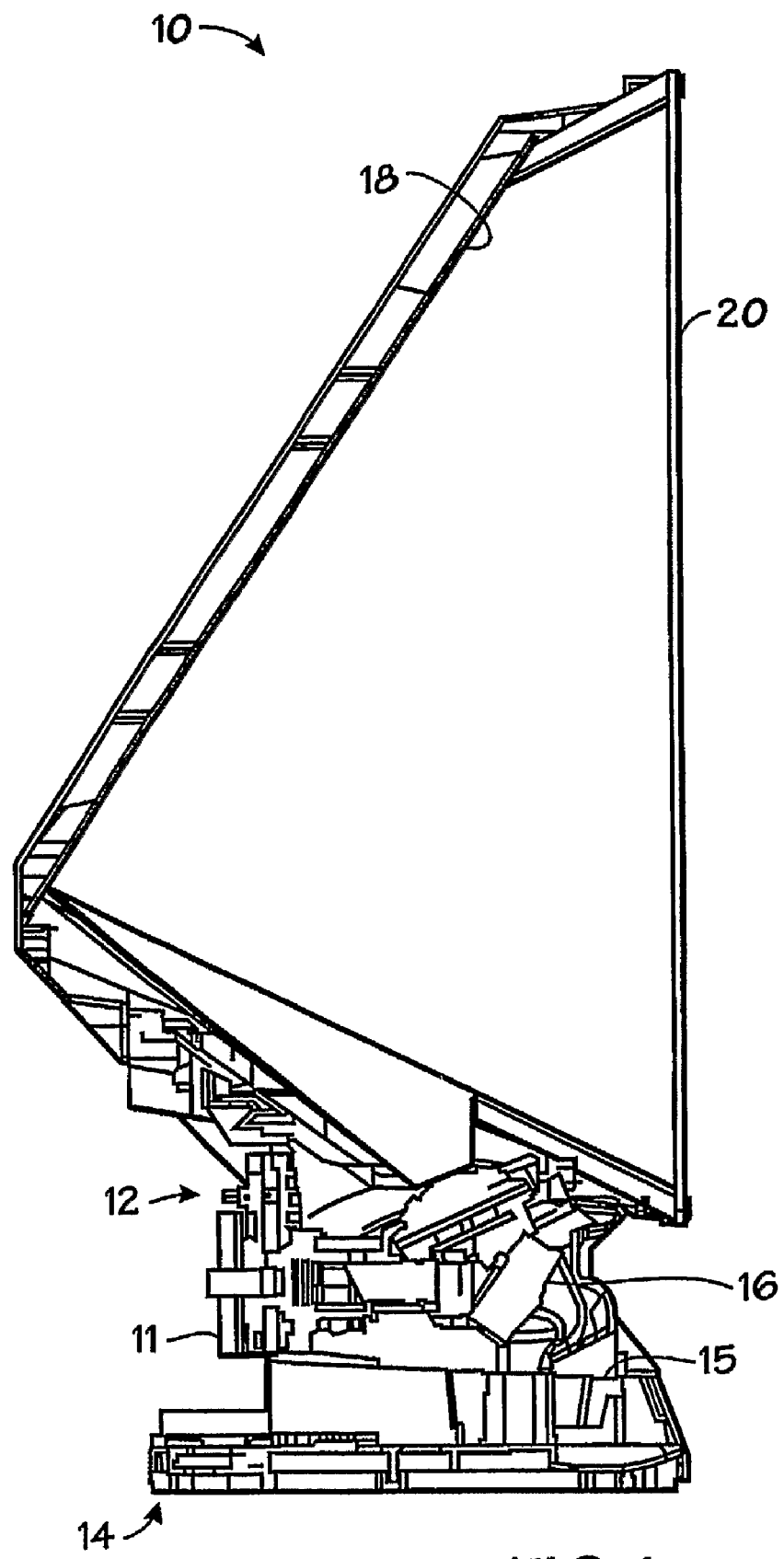
FIG. 1 is a diagram showing a side view of an exemplary system in accordance with an embodiment of the present invention.

Turning to the drawings, FIG. 1 is a drawing of a side view of an exemplary system 10 in accordance with an embodiment of the present technique. This system 10 may be a projection system for a television, as an example. For example, the system 10 may be a microdisplay rear projection television. This system 10 may include a cabinet 11 that encloses various components, such as a source 15, light engine assembly 16, a fold mirror 18, and a screen 20. The cabinet 11 may include an upper portion 12 and lower portion 14 that are coupled together to enclose the various components. The cabinet 11 may be formed out of a molded plastic, wood, metal, and/or other suitable materials, for example.

Further, the upper and lower portions 12 and 14 of the cabinet may also be utilized to support the image source 15, light engine assembly 16, fold mirror 18, and screen 20. The source 15 may be a video camera, computer, video receiver, cable, or other source of video signals. The light engine assembly 16, which is discussed below in greater detail in FIG. 2, may utilize signals from the source 15 to project an image onto the folded mirror 18. This image is reflected from the folded mirror 18 to the screen 20. Accordingly, the resulting image projected on the screen 20 is presented to a user viewing the screen 20 of the system 10.

To present the images to the screen 20, the images from the light engine source 16 are magnified. For example, in a system 10, such as a microdisplay rear projection televisions, the images may be magnified by a factor of 10 or more times the size of the original image in the light engine assembly 16. If the system 10 is a 61 inch DLP television, then the image presented at the screen 20 may be 110 times the size of a micromirror imager device (not shown) and 22 times the image size at the projection lens of the light engine assembly 16. As a result, small displacements of the light engine assembly 16 in the cabinet 11 may be magnified as visible errors on the screen 20. For instance, one problem that may result from alignment errors is known as "keystoning." Keystoning is a visual effect presented on the screen 20, when the distance from the projection lens to one side of the screen 20 is different than the distance from the projection lens to the other side of the screen 20. Keystoning can also be present when the light engine assembly 16 is tilted (left-to-right or top-to-bottom) in the cabinet 11 by as little as 0.1 millimeters (mm).

To reduce the errors associated with the misalignment or displacement between the light engine assembly 16, folded mirror 18, and the screen 20, the upper and lower portions 12 and 14 of the cabinet 11 may conform to certain tolerances to reduce possible distortion of the images being presented by the system 10. That is, the projection of the image relies on the precise construction of several very large molded plastic cabinet parts, such as the upper and lower cabinet portions 12 and 14. However, the tolerances of the upper and lower cabinet portions 12 and 14 may vary considerably relative to the requirements of a microdisplay system in the light engine assembly 16. Accordingly, if the light assembly 16 and the folded mirror 18 and the screen 20 are mounted on different portions 12 and 14, the potential errors associated with the tolerances is increased. As such, the operator or user of the system 10 may have to physically adjust various components to correct the error, which is a time consuming and costly process.

Advantageously, the light engine assembly 16 may be mounted by a mounting structure that bypasses or is not affixed or in physical contact with the lower portion 14 of the cabinet 11 to reduce the effects of variance in the tolerance of the lower portion 14 of the cabinet 11 on the projected image. That is, the light engine assembly 16 may be mounted into a mounting structure, and then attached directly to the upper portion 12 of the cabinet 11. Moreover, the upper portion 12 of the cabinet 11 may be formed from a single molded part that includes mounting features for the light engine assembly 16, fold mirror 18, and screen 20 of the system 10. By mounting each of these components to the upper portion 12, the tolerance variation or stackup is reduced.

Additionally, the mounting of the light engine assembly 16 to the upper portion 12 of the cabinet 11 reduces the structure and complexity of the lower portion 14 of the cabinet because no mounting system is utilized for this section of the cabinet 11. As a result, the lower portion 14 may be made thinner without concern for warping the images presented on the screen 20. That is, the images may be presented independently of the tolerance variation of the lower portion 14. Accordingly, the lower portion 14 may be manufactured by less costly processes than the upper portion 12. Finally, the mounting of the light engine assembly 16 to the upper portion 14 may lead to more compact space requirements (vertical and depth) because the light engine assembly 16 may be located in various locations relative to the upper portion 12.

As a specific example, the light engine assembly 16 may be mounted directly to the bottom of the upper portion 12 of the cabinet 11. In this configuration, the light engine assembly 16 does not depend on the precision of the lower portion 14 and other high tolerance cabinet parts. This method of mounting provides a low tolerance approach to mounting the light engine assembly 16 in a cabinet 11. More specifically, because the lower portion of the cabinet 11 is bypassed, the cabinet standard manufacturing tolerances may be reduced. For instance, if the tolerance of the lower portion 14 is from 1.6 mm to 0.13 mm, this amount of tolerance is removed from the overall tolerance that effects the alignment. Thus, the system 10 may be manufactured with standard low-cost manufacturing methods with little operator interaction for picture correction. The light engine assembly 16 is shown in greater detail in FIG. 2

Figure 2:
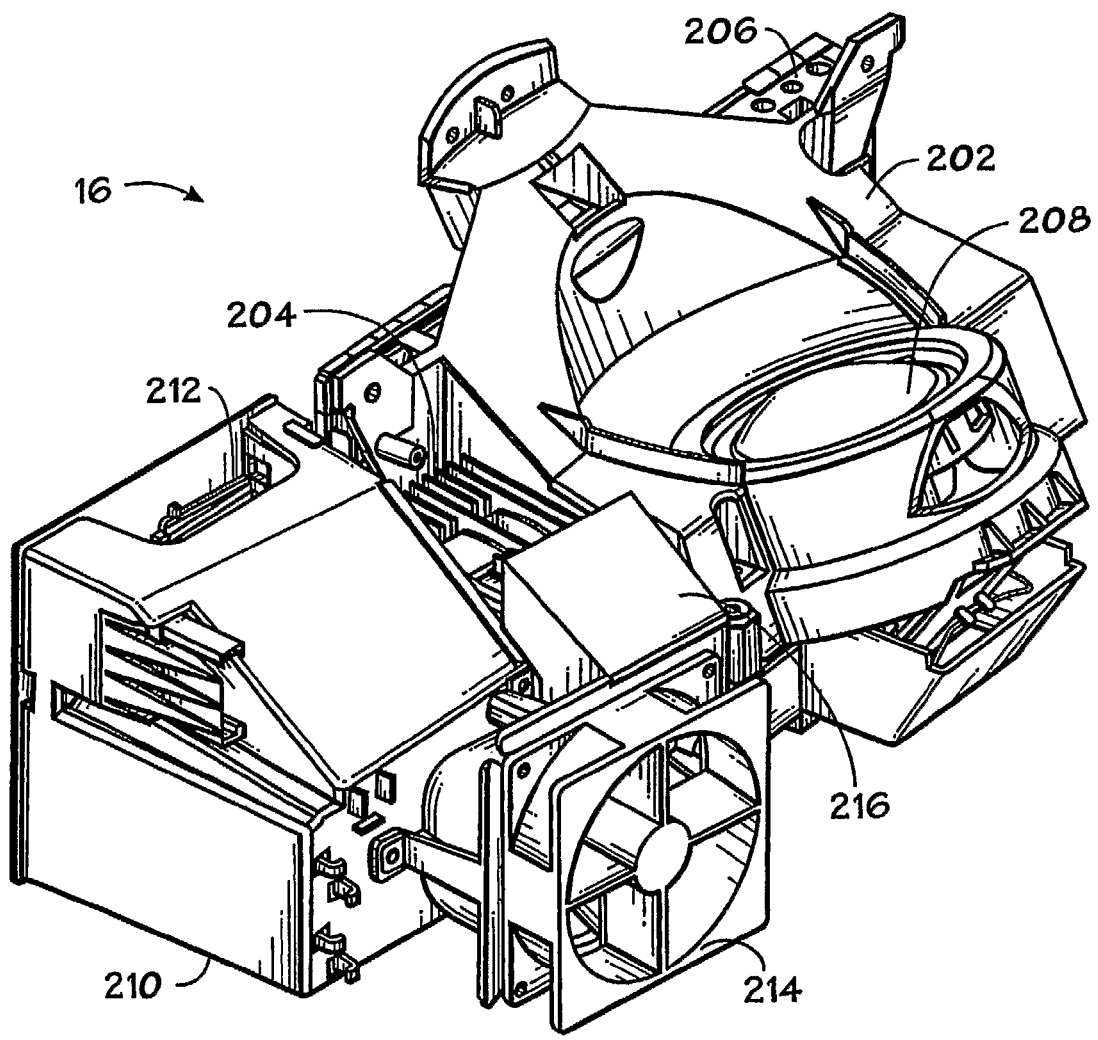
FIG. 2 is a diagram of an exemplary light engine assembly in the system of FIG. 1 in accordance with an embodiment of the present invention.

FIG. 2 is a diagram of an exemplary light engine assembly in the system of FIG. 1 in accordance with an embodiment of the present technique. In the light engine assembly 16 includes various components that are coupled to a mounting structure 202. The mounting structure 202 is configured to engage with the upper portion 12 of the cabinet 11 (FIG. 1), as shown in greater detail in FIG. 4 below. The mounting structure 202 is configured to attach the light engine assembly 16 to the upper cabinet 12 to reduce alignment errors.

Accordingly, the light engine assembly 16 may include various components, such as the mounting structure 202, a core optic heat sink 204, a DMD ("Digital Micro-Mirror Device") driver assembly 206, a projection lens 208, a lamp enclosure 210, a lamp cartridge 212, a fan 214, and a fan duct 216. The mounting structure 202, which is discussed below in FIG. 3 in greater detail, may be utilized to couple the light engine assembly 16 to the upper cabinet 12 of FIG. 1. The mounting structure 202 may include multiple parts that are coupled together to form a housing for the DMD driver assembly 206 and the projection lens 208. The DMD driver assembly 206 may be a printed circuit board that includes a DMD chip and other associated circuitry. The DMD chip is an optical semiconductor chip that includes microscopic mirrors, which operate as optical switches to create different colors and present high resolution images. The projection lens 208 are the lens that are utilized to project the images from the DMD driver assembly 206 to the fold mirror 18 of FIG. 1.

Coupled to the mounting structure 202 may be the core optic heat sink 204, lamp enclosure 210, lamp cartridge 212, fan 214, and the fan duct 216. The core optic heat sink 204, which is attached to the DMD driver assembly 206 and the mounting structure 202, may be utilized to dissipate heat from the DMD driver assembly 206 and other components. The lamp enclosure 210 may also be coupled to the mounting structure 202 for support. The lamp enclosure 210 may include a lamp cartridge 212 that provides a source of light to the DMD driver assembly 206. Further, the fan 214 may be coupled to the lamp enclosure 210 to cool the lamp cartridge 212 and core optics heat sink via the fan duct 216. The mounting structure 202 is shown in greater detail in FIG. 3.

Figure 3:
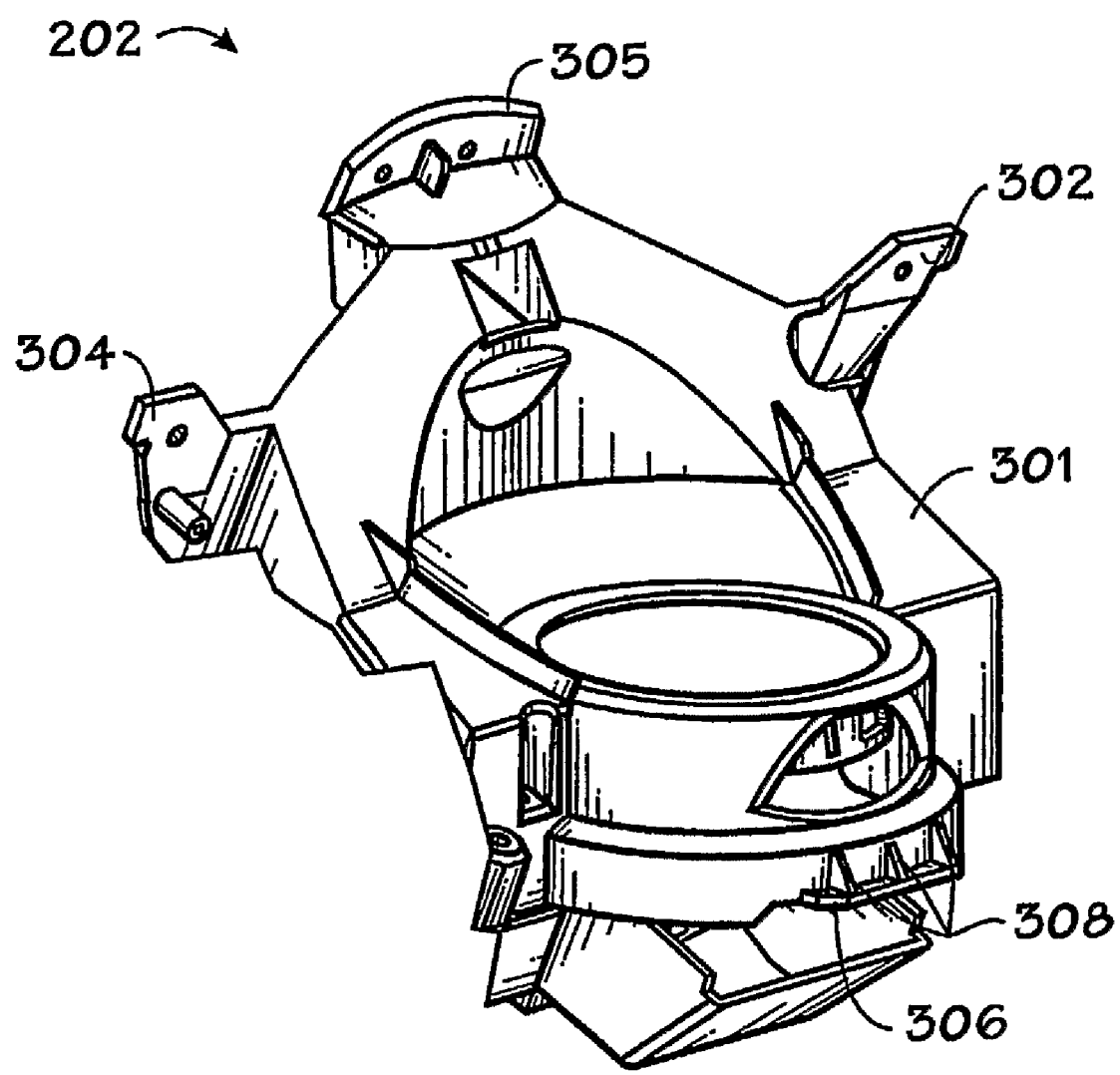
FIG. 3 is a diagram of a mounting structure for the light engine assembly of FIG. 1 in accordance with an embodiment of the present invention.

FIG. 3 is a diagram of the support structure for the light engine assembly of FIG. 1 in accordance with an embodiment of the present technique. In this embodiment, the mounting structure 202 is illustrated with the various features that are utilized to align the light engine assembly with the upper portion 12 of the cabinet 11 of FIG. 1. The mounting structure 202 include a main body 301 that is a molded plastic material formed to have a hollow interior region.

The main body 301 may also include various tabs, such as a first tab 302, a second tab 304, a third tab 305, and a fourth tab 306, to provide stability and support for the various components. The first, second, and third tabs 302, 304 and 305 may couple to one surface of the upper portion 12 of the cabinet 11 to provide support for the light engine assembly 16. These tabs 302, 304 and 305 may also serve as an anchor the mounting structure 202 to the one surface of the upper portion 12 of the cabinet 11. The fourth tab 306 may engage with the other surface opposite of the upper portion 12 of the cabinet 11. The fourth tab 306 may include various ribs 308 that are utilized to strengthen the fourth tab 306. By having the mounting structure engage with opposite sides of the upper portion 12 of the cabinet 11, the mounting structure 202 may reduce alignment errors by fixing the light engine assembly 16 into a stable position. The coupling of the mounting structure 202 with the upper portion 12 of the cabinet 11 is shown in greater detail in FIG. 4.

Figure 4:
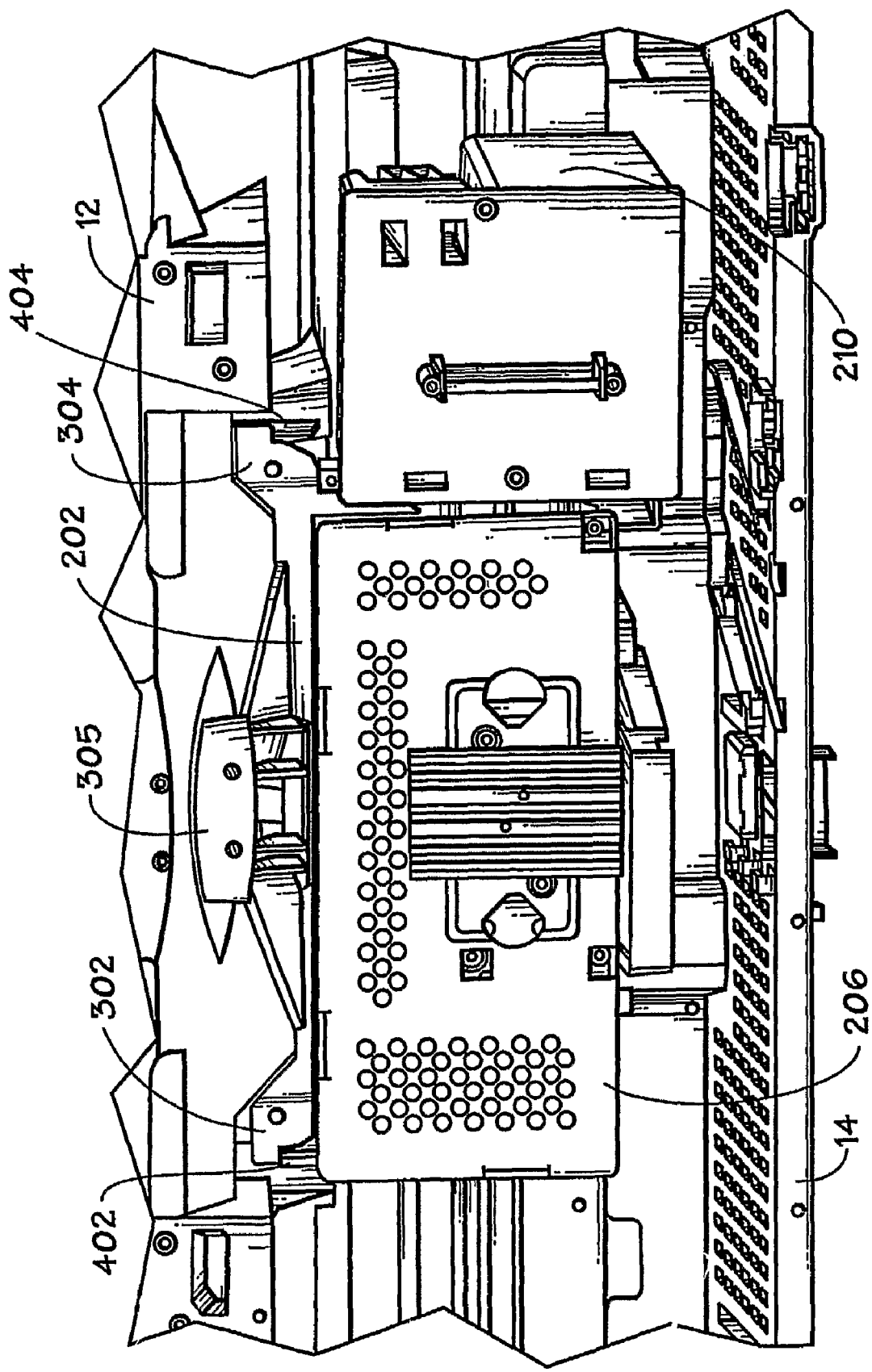
FIG. 4 is a diagram of an exemplary embodiment of the light engine assembly within a cabinet in accordance with an embodiment of the present invention.

FIG. 4 is a diagram of an exemplary embodiment of the light engine assembly within a cabinet in accordance with an embodiment of the present technique. In this diagram, the mounting structure 202 may engage with the upper portion 12 of the cabinet 11, while not engaging with the lower portion 14. Thus, the mounting structure 202 is able to support, stabilize, and align the light engine assembly 16.

To align the light engine assembly 16, the first and second tabs 302 and 304 may engage with reference surfaces 402 and 404 within the upper portion 12 of the cabinet 11. For instance, the first tab 302 may engage with the first reference surface 402, while the second tab 304 may engage with the second reference surface 404. This allows the operator to be able to adjust the mounting assembly 202 to correct any keystoning problems with in the system 10. As a result, the mounting structure 202 is able to reduce errors associated with the tolerances within the system 10.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:
    a housing structure including an upper portion and a lower portion;
    a mounting structure coupled to the housing structure, wherein the mounting structure is not affixed to the lower portion; and
    a light engine coupled to the mounting structure;
    wherein the mounting structure comprises a plurality of tabs configured to aid in alignment of the light engine within the housing structure by engaging with a plurality of surfaces within the upper portion, wherein the plurality of tabs comprises a first tab configured to engage with a first side of a first surface within the upper portion, and a second and third tab configured to engage with a second side of the first surface within the upper portion.

2. The system of claim 1, comprising a projection lens coupled to the mounting structure.

3. The system of claim 1, wherein the mounting structure is mounted to the upper portion of the housing structure.

4. The system of claim 1, wherein the mounting structure comprises a molded plastic form.

5. The system of claim 1, wherein the light engine comprises a digital micromirror device.

6. The system of claim 1, wherein the housing structure comprises a television cabinet.

7. The system of claim 1, wherein the system comprises a digital light processing television system.

8. A method of manufacturing a display unit, the method comprising:
    attaching a mounting structure to an upper portion of a housing structure, wherein the mounting structure is attached such that the mounting structure does not make physical contact with a lower portion of the housing structure, wherein attaching the mounting structure to the upper portion of the housing structure comprises engaging a first tab of the mounting structure with a first side of a first surface within the upper portion, and engaging a second and third tab of the mounting structure with a second side of the first surface within the upper portion;
    aligning a light engine with the housing structure using the first, second, and third tabs; and
    attaching the light engine to the mounting structure.

9. The method of claim 8, comprising aligning the light engine with respect to the upper portion of the housing structure by adjusting the position of the mounting structure with respect to the upper portion of the housing structure.

10. The method of claim 8, wherein aligning the light engine comprises aligning the light engine to correct a keystoning problem.

11. The method of claim 8, comprising forming the mounting structure out of plastic.

12. The method of claim 8, comprising attaching a projection lens to the display unit.

13. The method of claim 8, wherein attaching a light engine to the mounting structure comprises attaching a digital micromirror device to the mounting structure.

14. The system of claim 1, wherein the plurality of tabs comprises a fourth tab configured to engage with a second surface within the upper portion, wherein the second surface is on an opposite side of the upper portion from the first surface.

* * * * *